United States Patent [19]

Honda

[11] 4,290,125
[45] Sep. 15, 1981

[54] FISH DETECTOR CAPABLE OF DETECTING SPECIES OF FISH

[76] Inventor: Keisuke Honda, 62-1, Shinsanbongi, Sanbongi-cho, Toyohashi-shi, Aichi, Japan

[21] Appl. No.: 171,429

[22] Filed: Jul. 23, 1980

[30] Foreign Application Priority Data

Mar. 14, 1980 [JP] Japan .................. 55/31528

[51] Int. Cl.³ .......................... G01S 15/96
[52] U.S. Cl. .................. 367/87; 367/101; 367/110
[58] Field of Search .......... 367/87, 97, 101, 110, 367/113

[56] References Cited

U.S. PATENT DOCUMENTS 3,174,127 3/1965 Haslett .................. 367/87
4,081,783 3/1978 Honda .................. 367/101

Primary Examiner—Richard A. Farley
Attorney, Agent, or Firm—Burgess, Ryan & Wayne

[57] ABSTRACT

A fish detector capable of detecting species of fish. Two ultrasonic sounds at different frequencies and echoes are detected by receivers tuned to said different frequencies, respectively. The output signals from the receivers are converted into binary-coded signals and one of the binary-coded signal is divided by the other binary-coded signal. The ratio or quotient thus obtained is compared with a plurality of reference signals at different levels or strengths so as to detect whether or not the ratio or quotient is higher than the highest level or strength reference signal, lower than the lowest level or strength reference signal or between two reference signals at adjacent levels or strengths and subsequently to display in color depending upon a level of the ratio or quotient thus detected.

1 Claim, 1 Drawing Figure

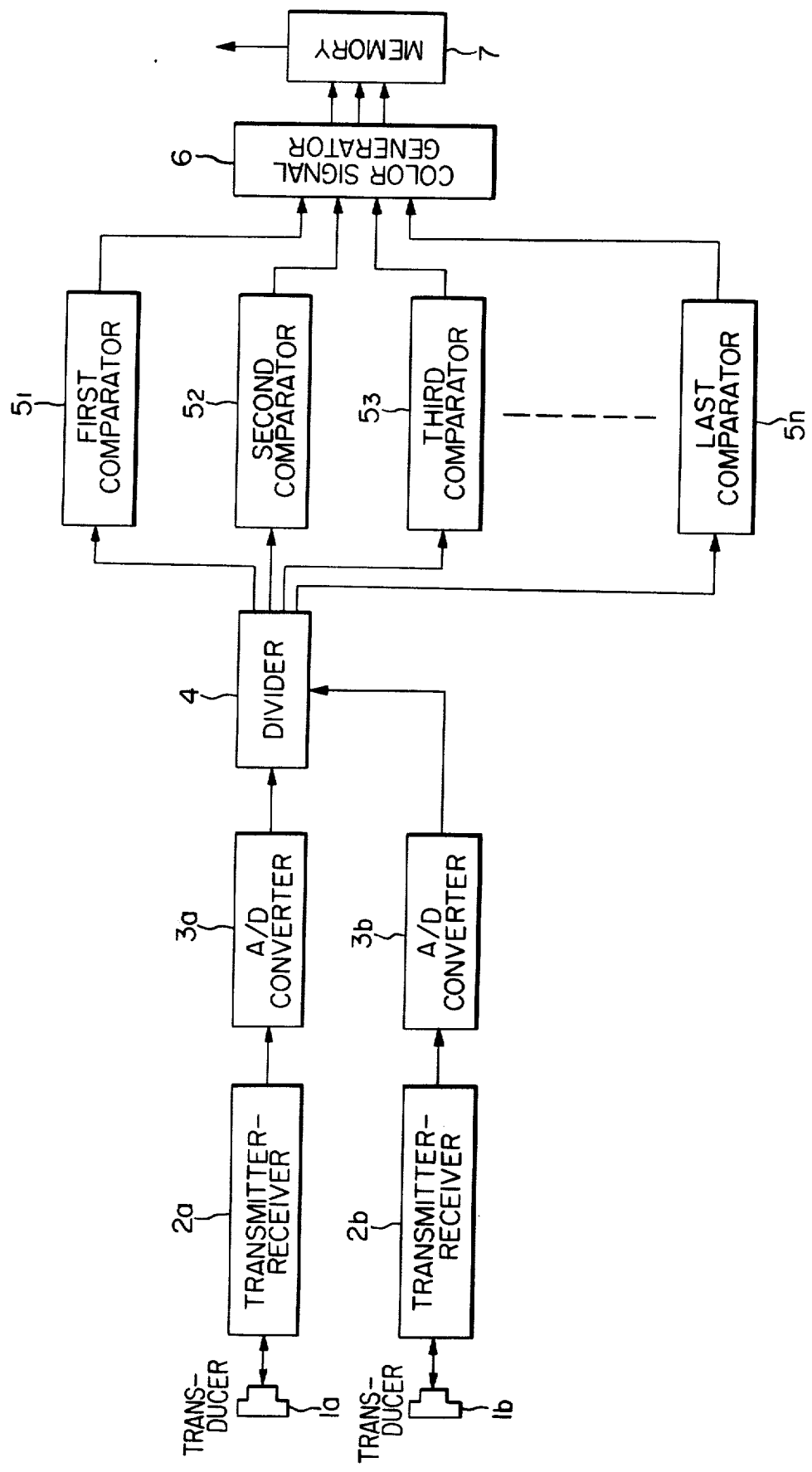

FISH DETECTOR CAPABLE OF DETECTING SPECIES OF FISH

BACKGROUND OF THE INVENTION

The present invention relates to an improved fish detector capable of detecting species of fish.

The same applicant has already disclosed a fish detector capable of detecting species of fish in U.S. Pat. No. 4,081,783. This fish detector projects two ultrasonic sounds at different frequencies and one of the two detected echoes is subtracted from the other detected echo so that a difference signal is displayed. When the detected echo at a high frequency is subtracted from the detected echo at a low frequency, only the fish in very small size such as the young of sardines can be detected and recorded or displayed.

However, the fish detector of the type described above has a problem that when a subtrahend and a minuend are almost equal or when a subtrahend is greater than a minuend, the fish detector cannot record or display the species of fish. Thus an operator cannot detect whether the fish detector is malfunctioning or there is no record or display because fish is not being detected. In addition, there arises a difficult problem of adjusting the detected echoes at different frequencies.

SUMMARY OF THE INVENTION

In view of the above, one of the objects of the present invention is to provide a fish detector in which detected echoes at different frequencies are converted into binary coded signals, respectively, and one of the binary-coded signals is divided by the other so that a ratio or quotient thus obtained is displayed in color depending its level or strength.

Therefore, according to the present invention, even when two detected echoes are different in level or strength, the results are displayed in the same color as far as the ratios or quotients are same.

According to the present invention, instead of displaying in color, the results can be displayed in density.

The fish detector in accordance with the present invention is advantageous in that the operation is very simple and even species of fish can be detected very distinctly.

BRIEF DESCRIPTION OF THE DRAWING

Single FIGURE is a block diagram of a preferred embodiment of the present invention.

DESCRIPTION OF THE PREFERRED EMBODIMENT

Referring to the single figure, a fish detector in accordance with the present invention has transducers $1a$ and $1b$, transmitter-receivers $2a$ and $2b$ for the generation and detection of the electrical impulses at different frequencies to and from respective transducers $1a$ and $1b$ and A/D converters $3a$ and $3b$ for the conversion of the output signals from the transmitter-receivers $2a$ and $2b$ into binary coded signals. A divider 4 divides the output signal from the A/D converter $3a$ or $3b$ by the output signal from the A/D converter $3b$ or $3a$, and the output signal X from the divider 4 is applied to a plurality of comparators $5_1$ through $5_n$ for the comparison with reference signals c. More specifically, the first comparator $5_1$ compares the output signal X from the divider 4 with a reference signal $c_1$ having the highest level or magnitude so as to indicate whether or not the former is greater than or equal to the first reference signal $c_1$. The second comparator $5_2$ compares its input signal X with a second reference signal $c_2$ so as to indicate whether $c_1 > X \geq c_2$. The third comparator $5_3$ indicates whether $c_2 > X \geq c_3$. The last comparator $5_n$ indicates whether $c_{n-1} > X \geq c_n$, $c_n$ having the lowest level or magnitude. The output signals from these comparators $t_1$ through $5_n$ are applied to a color signal generator 6 which in turn generates a color signal representative of a color which is dependent upon the level of the output signal received from each of the comparators $5_1$ through $5_n$; that is, depending upon the output signal X from the divider 4. The color signals from the color signal generator 6 are once stored in a memory 7 and then displayed on a cathode-ray tube or the like (not shown). Instead of generating the color signals, the output signals from the comparators $5_1$ through $5_n$ can be displayed on a suitable display system in terms of density.

In general, small fish has a high target strength or the reflecting power of the fish when the ultrasonic waves transmitted have a high frequency of the order of, for instance, 200 kHz, but the small fish exhibits a low target strength to the ultrasonic waves of a low frequency of the order of, for instance, 50 kHz. However, the ultrasonic waves at low frequencies have a low propagation loss so that they can reach a deeper depth. Therefore, when the echo at a high frequency is divided by the echo at a low frequency, surface reverberation and reverberation due to foams can be substantially eliminated. Therefore, even when the echoes from small fish such as the young of sardines vary in level or strength over a wide range, the detected echoes can be distinctly displayed in color depending upon the level or strength of the received echoes.

On the other hand, when the echo at a high frequency is divided by the echo at a low frequency, the echoes from medium- and large-size fishes swimming at relatively deep depths can be displayed also in color depending upon the level or strength of the detected echoes.

When the signals at various levels or strengths are applied to the divider 4 and when the ratios or quotients obtained by the divider 4, they are displayed in the same color. As a result, the fish detector of the present invention can distinctly detect the fish in such deep depths and in such small size that the prior art fish detectors cannot detect at all.

Instead of displaying the species of fish in color, they can be displayed in density.

What is claimed is:

1. A fish detector capable of detecting the species of fish CHARACTERIZED in that
   two ultrasonic sounds at different frequencies are projected,
   their echoes are received by transmitter-receivers, respectively,
   the output signals by detected echoes from said transmitter-receivers are converted into binary-coded signals,
   one of said binary-coded signals is divided by the other binary-coded signal,
   the ratio thus obtained is compared with a number of n reference signals at different levels, thereby detecting whether or not said ratio is greater than the reference signal at the highest level, smaller than the reference signal at the lowest level or between the reference signals at adjacent levels and subsequently displaying in color depending upon the level thus detected.

* * * * *